(12) United States Patent
Li et al.

(10) Patent No.: US 10,410,095 B2
(45) Date of Patent: Sep. 10, 2019

(54) METHOD AND SYSTEM FOR IDENTIFYING A PAYMENT CARD DESIGN (71) Applicant: MASTERCARD ASIA/PACIFIC PTE LTD, Singapore (SG)

(72) Inventors: Jiaming Li, Singapore (SG); Jie Zhang, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 140 days.

(21) Appl. No.: 15/591,616

(22) Filed: May 10, 2017

(65) Prior Publication Data
US 2017/0330057 A1 Nov. 16, 2017

(30) Foreign Application Priority Data
May 11, 2016 (SG) .............................. 10201603768S (51) Int. Cl.
*G06K 9/62* (2006.01)
*G06N 3/04* (2006.01)
*G07F 7/08* (2006.01)
*G06Q 20/34* (2012.01)
*G06K 9/52* (2006.01)

(52) U.S. Cl.
CPC ......... *G06K 9/6277* (2013.01); *G06K 9/6212* (2013.01); *G06K 9/6215* (2013.01); *G06N 3/04* (2013.01); *G06Q 20/355* (2013.01); *G07F 7/0813* (2013.01); *G06K 9/52* (2013.01); *G06K 2209/19* (2013.01)

(58) Field of Classification Search
CPC ...... G06Q 20/355; G07F 7/0813; G06N 3/04; G06K 9/52; G06K 9/6212; G06K 9/6215; G06K 9/6277; G06K 2209/19
USPC ........................................................ 382/217
See application file for complete search history.

(56) References Cited

U.S. PATENT DOCUMENTS

2008/0030798 A1 2/2008 O'Neil
2008/0091459 A1* 4/2008 Elgar ..................... G06Q 10/06
                                                         705/300

(Continued)

FOREIGN PATENT DOCUMENTS

DE      102014207439 A1    10/2015
WO      WO2015/143237      9/2015

*Primary Examiner* — Daniel G Mariam
(74) *Attorney, Agent, or Firm* — Harness, Dickey & Pierce, P.L.C.

(57) ABSTRACT

A computer-implemented method of identifying a payment card design includes partitioning an image of a detected payment card into a plurality of blocks, the image comprising predetermined portions irreversibly masked; and generating an individual numerical representation of each respective one of the plurality of blocks, thereby generating a collective numerical representation of the design of the detected payment card. The method also includes selecting, from a database storing a plurality of payment card designs, one or more payment card designs based on the collective numerical representation of the design of the detected payment card. The method further includes generating a similarity score between the design of the detected payment card and each of the one or more selected payment card designs; and associating the design of the detected payment card with one of the one or more selected payment card designs based on the similarity score.

19 Claims, 9 Drawing Sheets

(56) References Cited

U.S. PATENT DOCUMENTS

| | | | |
|---|---|---|---|
| 2009/0152357 A1 | 6/2009 | Lei et al. | |
| 2010/0280921 A1* | 11/2010 | Stone | G06O 30/0603 705/27.1 |
| 2011/0264612 A1* | 10/2011 | Ryman-Tubb | G06Q 20/4016 706/12 |
| 2014/0037220 A1* | 2/2014 | Phillips | G06Q 20/3221 382/232 |
| 2016/0048837 A1 | 2/2016 | Jin et al. | |
| 2017/0039387 A1* | 2/2017 | Leonardi | G06F 21/6245 |

\* cited by examiner

METHOD AND SYSTEM FOR IDENTIFYING A PAYMENT CARD DESIGN

CROSS-REFERENCE TO RELATED APPLICATION

This application claims the benefit of and priority to Singapore Patent Application No. 10201603768S, filed May 11, 2016. The entire disclosure of the above application is incorporated herein by reference.

FIELD

The present disclosure relates broadly, but not exclusively, to a method and system for identifying a payment card design, and to a method of providing information specific to a payment card.

BACKGROUND

This section provides background information related to the present disclosure which is not necessarily prior art.

There are instances during the course of normal commerce that it is desirable to know certain information, such as card program, card issuer, etc., about a payment card (e.g., a credit or debit card) without the user of the payment card actually making a transaction. Such information can be used to understand consumer interests, spending patterns, etc., as a group of specific card holders, or to provide the card holder with relevant information, such as promotions, offers, etc., for a specific card.

Currently, to detect the card type and other generic information, the most commonly-used approach is to read the Primary Account Number (PAN) of a user's card and find the Bank Identification Number (BIN) for the card, and match the BIN with card issuer and relevant card program. This process involves the extraction and temporary storage and possible transmission of sensitive information which is vulnerable to hacking and interception by a third party. While encryption can be used to secure the process, it can result in added costs.

A need therefore exists to provide a method that seeks to address at least some of the above-mentioned problems or provide a useful alternative.

SUMMARY

This section provides a general summary of the disclosure, and is not a comprehensive disclosure of its full scope or all of its features. Aspects and embodiments of the disclosure are also set out in the accompanying claims.

A first aspect of the present disclosure provides a computer-implemented method of identifying a payment card design, the method comprising the steps of: partitioning, by a processor, an image of a detected payment card into a plurality of blocks, the image comprising predetermined portions irreversibly masked; generating, by the processor, an individual numerical representation of each respective one of the plurality of blocks, thereby generating a collective numerical representation of the design of the detected payment card; selecting, from a database storing a plurality of payment card designs, one or more payment card designs based on the collective numerical representation of the design of the detected payment card; generating, by the processor, a similarity score between the design of the detected payment card and each of the one or more selected payment card designs; and associating, by the processor, the design of the detected payment card with one of the one or more selected payment card designs based on the similarity score.

Each numerical representation may comprise a respective feature vector.

The stored payment card designs may comprise respective feature vectors in a multi-dimensional space, and the one or more stored payment card designs may be selected based on a position of the generated collective feature vector representing the design of the detected payment card in the multi-dimensional space.

The one or more stored payment card designs may be selected based on distance to the position of the generated collective feature vector representing the design of the detected payment card in the multi-dimensional space.

Generating a similarity score may comprise using one technique selected from the group consisting of convolutional neural network (CNN), template matching and support vector machines (SVM).

Generating the similarity score may further comprise comparing the plurality of blocks of the detected payment card with the corresponding blocks of the one or more selected card designs.

Generating the similarity score may further comprise comparing the whole image of the detected payment card with a whole image of the one or more selected card designs.

Comparing may comprise using a trained 2-class or multi-class classifier.

Associating the design of the detected payment card with one of the one or more selected payment card designs based on the similarity score may comprise associating with the selected payment card design having the highest similarity score.

Associating the design of the detected payment card with one of the one or more selected payment card designs based on the similarity score may comprise associating with the selected payment card design if the similarity score exceeds a predetermined threshold.

Partitioning the image of the detected payment card into a plurality of blocks may comprise assigning respective weights to the blocks, or weight vectors to the numerical representation of the blocks.

Each stored payment card design may comprise a design received from a trusted source, and storing said design may comprise the steps of: irreversible masking, by a processor coupled to the database, predetermined portions of the payment card design; partitioning, by the processor coupled to the database, the payment card design received from the trusted source into a plurality of blocks; generating, by the processor coupled to the database, an individual feature vector of each respective one of the plurality of blocks, thereby generating a collective feature vector of the payment card design received from the trusted source; and storing the collective feature vector in the database.

The method may further comprise normalizing the individual feature vectors of the plurality of blocks before generating the collective feature vector of the payment card design received from the trusted source.

The method may further comprise normalizing the collective feature vector of the payment card design received from the trusted source before storing said collective feature vector in the database.

Partitioning the payment card design received from the trusted source into a plurality of blocks may comprise assigning respective weights to the blocks, or weight vectors to the numerical representation of the blocks.

Storing said design may further comprise using the design to train a 2-class or multi-class classifier.

Each stored payment card design may comprise information selected from a group consisting of issuer name, card network, card type, and card program.

The method may further comprise a step of extracting the image of the detected payment card from a captured image prior to the partitioning step.

A second aspect of the present disclosure provides a method of providing information specific to a payment card, the method comprising the steps of: identifying the design of a payment card captured at a customer's device using the method as defined in the first aspect; retrieving, from a database, information specific to the payment card based on the identified design; and sending the retrieved information to the customer's device.

A third aspect of the present disclosure provides a system for identifying a payment card design, comprising a processor and a memory unit communicatively coupled to the processor, wherein the processor is configured to: partition an image of a detected payment card into a plurality of blocks, the image comprising predetermined portions irreversibly masked and being at least temporarily stored in the memory unit; generate an individual numerical representation of each respective one of the plurality of blocks, to thereby generate a collective numerical representation of the design of the detected payment card; select, from a database storing a plurality of payment card designs, one or more payment card designs based on the collective numerical representation of the design of the detected payment card; generate a similarity score between the design of the detected payment card and each of the one or more selected payment card designs; and associate the design of the detected payment card with one of the one or more selected payment card designs based on the similarity score.

Each numerical representation may comprise a respective feature vector.

The stored payment card designs may comprise respective feature vectors in a multi-dimensional space, and the processor may be further configured to select the one or more stored payment card designs based on a position of the generated collective feature vector representing the design of the detected payment card in the multi-dimensional space.

The processor may be further configured to select the one or more stored payment card designs based on a distance to the position of the generated collective feature vector representing the design of the detected payment card in the multi-dimensional space.

The processor may be further configured to generate a similarity score using one technique selected from the group consisting of convolutional neural network (CNN), template matching and support vector machines (SVM).

The processor may be further configured to compare the plurality of blocks of the detected payment card with the corresponding blocks of the one or more selected card designs, to generate the similarity score.

The processor may be further configured to compare the whole image of the detected payment card with a whole image of the one or more selected card designs to generate the similarity score.

The processor may be further configured to associate the design of the detected payment card with one of the one or more selected payment card designs based on the similarity score by associating with the selected payment card design having the highest similarity score.

The processor may be further configured to associate the design of the detected payment card with one of the one or more selected payment card designs based on the similarity score comprised by associating with the selected payment card design if the similarity score exceeds a predetermined threshold.

The processor may be further configured to partition the image of the detected payment card into a plurality of blocks by assigning respective weights to the blocks, or weight vectors to the numerical representation of the blocks.

Each stored payment card design may comprise information selected from a group consisting of issuer name, card network, card type, and card program.

The processor may be further configured to extract the image of the detected payment card from a captured image prior to partitioning the image of the detected payment card.

A fourth aspect of the present disclosure provides a non-transitory computer-readable medium having stored thereon computer instructions executable to implement a method of identifying a payment card design, the method comprising the steps of: partitioning, by a processor, an image of a detected payment card into a plurality of blocks, the image comprising predetermined portions irreversibly masked; generating, by the processor, an individual numerical representation of each respective one of the plurality of blocks, thereby generating an overall numerical representation of the design of the detected payment card; selecting, from a database storing a plurality of payment card designs, one or more payment card designs based on the overall numerical representation of the design of the detected payment card; generating, by the processor, a similarity score between the design of the detected payment card and each of the one or more selected payment card designs; and associating, by the processor, the design of the detected payment card with one of the one or more selected payment card designs based on the similarity score.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments of the disclosure will be better understood and readily apparent to one of ordinary skill in the art from the following written description, by way of example only, and in conjunction with the drawings, in which.

Corresponding reference numerals indicate corresponding parts throughout the several views of the drawings.

DETAILED DESCRIPTION

Embodiments of the present disclosure will be described, by way of example only, with reference to the drawings. The description and specific examples included herein are intended for purposes of illustration only and are not intended to limit the scope of the present disclosure.

Embodiments of the present disclosure provide a method to identify the design of a detected payment card through image processing and recognition without reading sensitive information or personal data associated with the payment card, such as the PAN, card holder's name, expiry date, etc.

The example embodiments will now be described, by way of example only, with reference to the drawings. Like reference numerals and characters in the drawings refer to like elements or equivalents.

Figure 1:
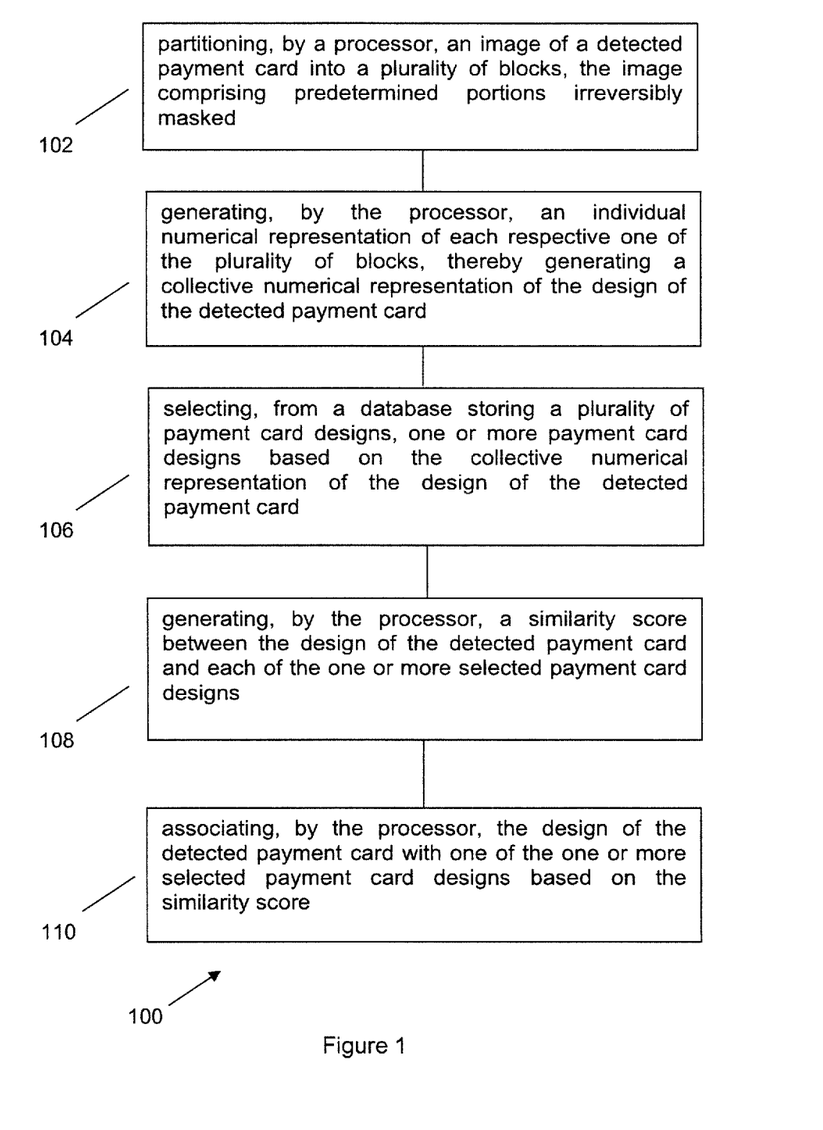
FIG. 1 shows a flow chart illustrating a method of identifying a payment card design according to an example embodiment.

FIG. 1 shows a flow chart 100 illustrating a computer-implemented method of identifying a payment card design according to an example embodiment. At step 102, an image of a detected payment card is partitioned into a plurality of blocks by a processor. As described below, typically the image of the payment card is captured by the payment card user and stored in a consumer device, such as a mobile phone, a tablet or laptop computer, where the image can be accessed. Alternatively, the image may be retrieved by the consumer device from a remote storage, such as a cloud server. The image includes predetermined portions irreversibly masked. At step 104, an individual numerical representation of each respective one of the plurality of blocks is generated by the processor. The processor thereby generates a collective numerical representation of the design of the detected payment card. At step 106, one or more payment card designs are selected from a database storing a plurality of payment card designs based on the collective numerical representation of the design of the detected payment card. At step 108, a similarity score between the design of the detected payment card and each of the one or more selected payment card designs is generated by the processor. At step 110, the design of the detected payment card is associated with one of the one or more selected payment card designs based on the similarity score by the processor.

The image of the detected payment card preferably has sensitive information (such as the PAN, card holder's name, expiration date, etc.) irreversibly masked. In other words, there is no way to restore the original image showing the sensitive information. In one implementation, a coloured block image is used to replace the real image pixels on the area(s) of the card image showing the sensitive information. Only the process of masking the sensitive information is required to happen in the customer device, such as a mobile phone or a tablet, in order to avoid transferring the sensitive information to a server implementing the remaining steps via a network. The rest of the other steps can be done at either the customer device or server in the cloud.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium, such as exemplified in the Internet system, or wireless medium, such as exemplified in the GSM mobile telephone system. The computer program when loaded and executed on such a computer effectively results in an apparatus that implements the steps of the preferred method.

The present disclosure relates to methods of identifying the design of a payment card. Currently, many merchants accept electronic payment transactions as an alternative to cash for the payment for products. In such electronic payment transactions, a payment card may be used. As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers.

In the example embodiments, card designs from trusted sources, such as a card issuer (e.g., a bank or other financial institution, or a retailer), are used to create a database containing known payment card designs. Typically, such card designs are received as images which are then converted into respective numerical representations using a computer.

Figure 2A:
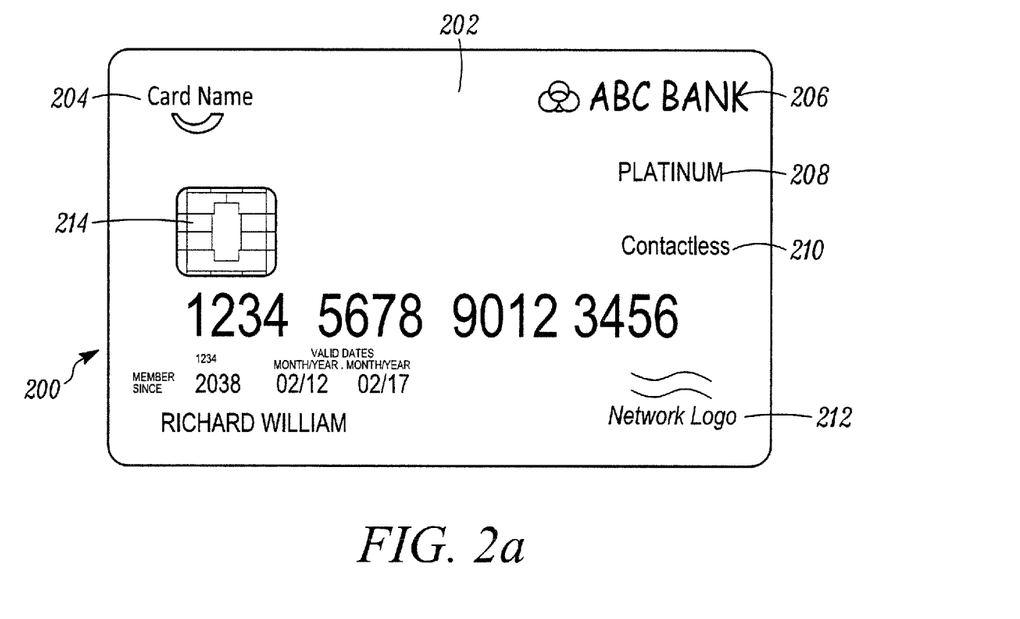
FIGS. 2a-2d show schematic diagrams illustrating partitioning of a payment card design from a trusted source according to an example embodiment.

FIG. 2a shows an example image of a payment card 200. The payment card 200 typically includes both card features and personal data. The card features may include background 202, card name 204, card issuer name 206, card type 208, contactless payment feature 210, card network 212, and embedded chip (i.e. integrated circuit) 214. Some of the card features, such as card type 208, contactless payment feature 210, card network 212 and embedded chip 214, are generic across different payment card designs while other features, such as background 202, card name 204 and issuer name 206 are specific to a certain payment card design.

The personal data encoded on the payment card 200 may comprise at least one of: primary account number (PAN), expiration date, service code, and cardholder name. The PAN refers to the entire string of numbers of an account and its associated payment card. The leading digits (usually the first six) of the PAN are referred to as the Bank Identification Number (BIN). The service code determines where and how the payment card can be used (e.g. as an ATM card only, domestic use only, international use, etc.).

Typically, the payment card 200 is sized according to a standard, for example, standards promulgated by the International Organization for Standardization (ISO) and the International Electrotechnical Commission (IEC). More specifically, ISO/IEC 7810:2003 ID-1 specifies a size for payment cards of 85.60 mm by 53.98 mm. Additionally, ISO/IEC 7813 specifies that an ID-1 compliant payment card have a thickness of 0.76 mm and corners rounded with a radius of 3.18 mm. The personal data is normally disposed at predetermined positions on the payment card 200.

Figure 2B:
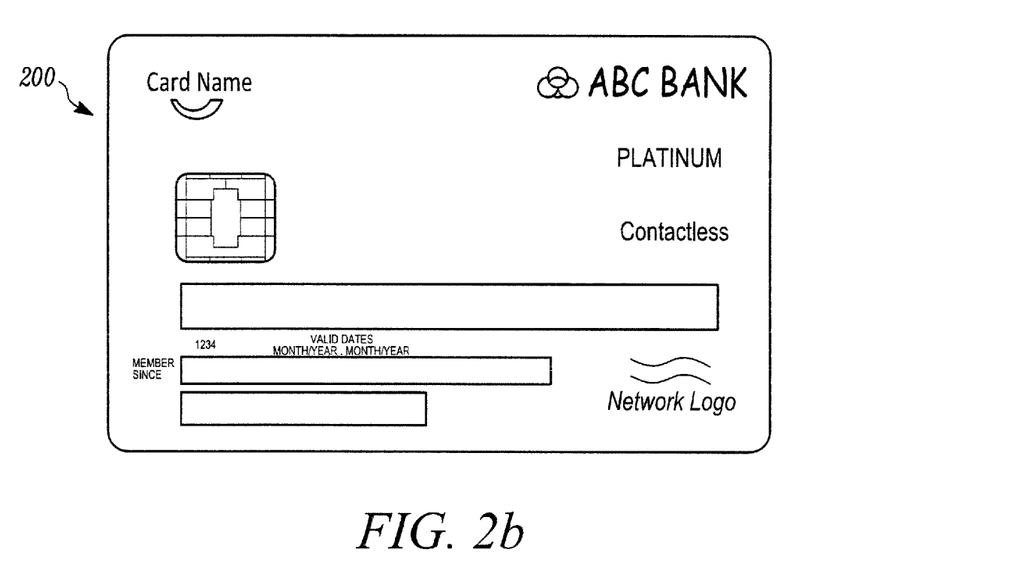

The present method seeks to identify the design of a payment card by its card features, rather than the personal data. Thus, in one implementation, when creating an entry for the payment card 200 in the database of known payment card designs, the portions on the payment card 200 where the personal data is displayed are masked, as shown in FIG. 2b, before the image is further processed. This can be done preferably automatically through image processing, e.g., based on the scale of the image and using the corners or edges of the payment card 200 as reference.

Figure 2C:
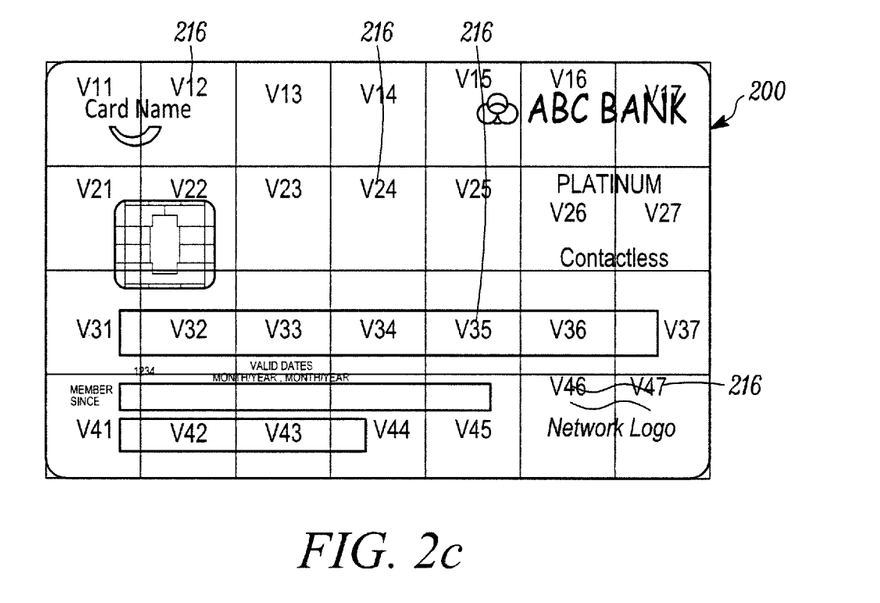

Next, the image of the payment card 200 is partitioned into a plurality of blocks 216, with each block being assigned a block identifier. FIG. 2c shows an example in which the payment card 200 is partitioned into a matrix of rectangular blocks containing 4 rows and 7 columns, making 28 blocks; however, it will be appreciated that different numbers of rows and columns can be used in alternate embodiments. In some implementations, the blocks may be assigned different weights based on, for example, their respective positions on the card layout.

Figure 2D:
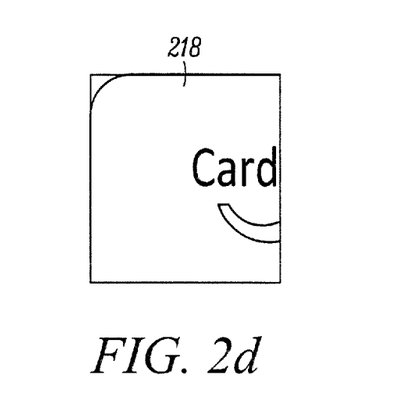

In order to obtain a numerical representation of the whole image, i.e., the card design, numerical representations of each of the individual blocks are first generated using techniques that will be appreciated by a person skilled in the art. For example, such numerical representations can be feature vectors which may be obtained through feature recognition and extraction, or a trained neural network model for the specific block position in the card design. Weight vectors may be assigned to the respective numerical representations. FIG. 2d shows an image of a block 218 from the first row and first column of the matrix and designated an identification v11. Next, the feature vector generated from block 218 is then normalised and combined with the normalised features vectors of all remaining blocks (v12, v13 . . . , v21, v22 . . . , V47) to obtain an overall or collective numerical representation, e.g., a multi-dimensional feature vector, of the card design.

Alternatively, the individual features vectors are first combined to form the collective multi-dimensional feature vector and then a normalization process may be introduced and applied to the multi-dimensional feature vector. A normalized multiple-dimensional feature vector will be generated for each card design. Different vector fields may apply different normalization methods based on the features used to generate the field value. The normalization parameters used for the normalization method of the example embodiments can be generated based on the machine learning training result (for example, neural network) from large samples of real card images taken in various environments, which gives the highest accuracy score of card design recognition. The parameters may also be set based on experience or fine tuning manually.

In another implementation, a trained neural network model can be applied to each image block which can also give a normalized multi-dimensional numerical representation of the image block.

Figure 3:
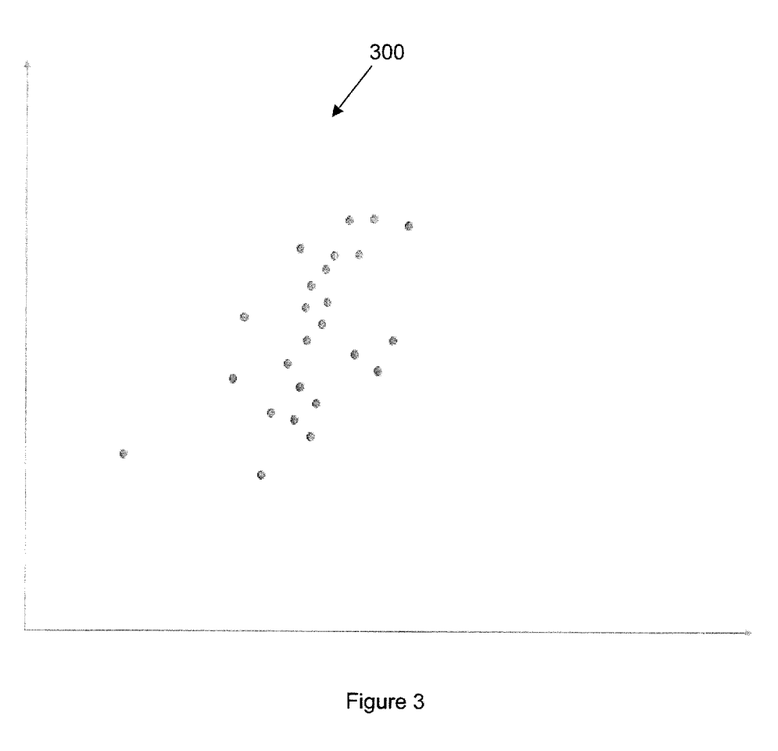
FIG. 3 shows an example multi-dimensional space containing a plurality of feature vectors.

Thus, for every unique payment card design, a corresponding normalized multi-dimensional feature vector representing that design can be generated. Since there are various card designs that are in circulation, a plurality of such features vectors may be generated and stored in the database. In one implementation, a multi-dimensional space is created in which each of the plurality of multi-dimensional feature vectors can be uniquely located as a discrete point. FIG. 3 shows an example multi-dimensional space 300 having a plurality of such discrete points scattered therein. When a new card design from a trusted (i.e., verified) source is introduced, its corresponding feature vector is added to the database and occupies a respective spot in the multi-dimensional space.

With the database created, a detected payment card design can be identified in the method of the example embodiments. Typically, the database is located in a server, while the detected payment card design is from an image or photo stored in a consumer device such as a mobile phone or tablet computer, that can communicate with the server. For example, the consumer may take a card image using the mobile phone's camera or access a stored image of the card inside the mobile phone's storage.

Figure 4A:
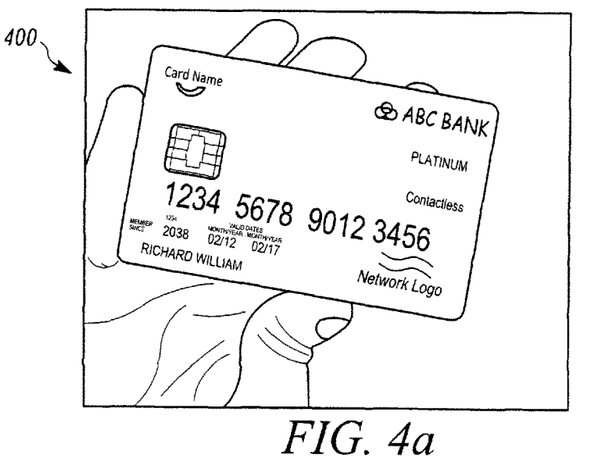
FIGS. 4a-4c show schematic diagrams illustrating extraction of a payment card design from an image according to an example embodiment.
Figure 4B:
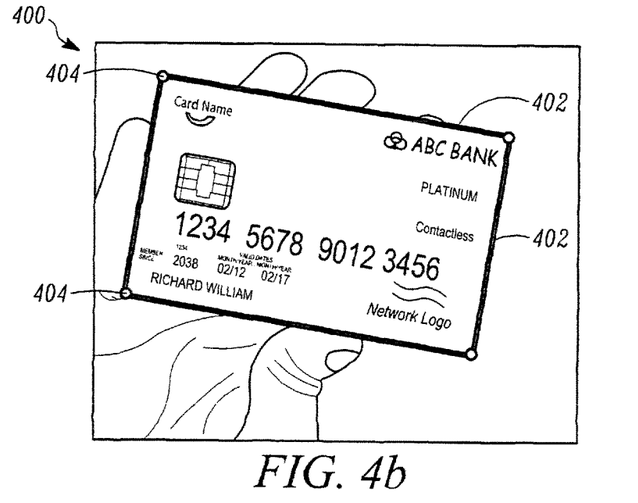
Figure 4C:
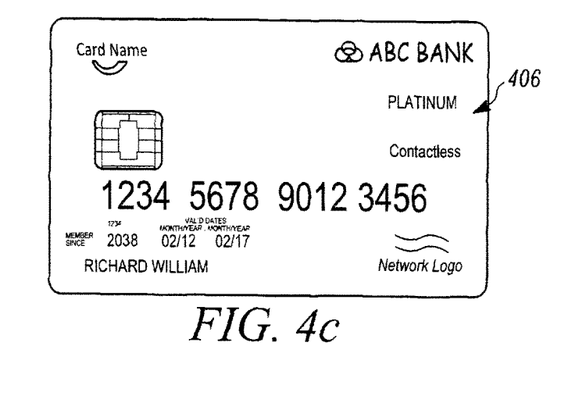

FIGS. 4a-4c show schematic diagrams illustrating extraction of a payment card design from an image according to an example embodiment. If the card design is inside an image with non-relevant background, such as image 400 shown in FIG. 4a, a card image extraction method is applied. For example, an edge detection mechanism, such as Sobel edge detector, is used to detect card edges 402, as shown in FIG. 4b. The card corners 404 (FIG. 4b) are calculated based on the intercept point of the respective edges. As the real size and ratio of the card dimensions are known based on the card design standard, the card image 406 (FIG. 4c) can be reconstructed based on, for example, a perspective transform.

In the present identification method, an image of the detected payment card, such as image 406 in FIG. 4c, is first irreversibly masked at portions of the image showing sensitive information. These portions typically can be determined based on the card design standard. Next, the masked image is partitioned into a plurality of blocks in a similar manner as described above with reference to the storing of a card design. For example, the image of the detected payment card may be partitioned into a matrix of rectangular blocks containing 4 rows and 7 columns. An individual numerical representation of each respective one of the plurality of blocks is generated to thereby generate an overall or collective numerical representation, e.g., a multi-dimensional feature vector, of the design of the detected payment card in a similar manner as described above with reference to the storing of a card design. Weights may be assigned to the respective blocks, and alternatively, weight vectors may be assigned to the respective individual numerical representations, as described above. Further, the same normalization mechanism and parameters used for storing the card design can be applied to the detected card design feature vector.

Figure 5:
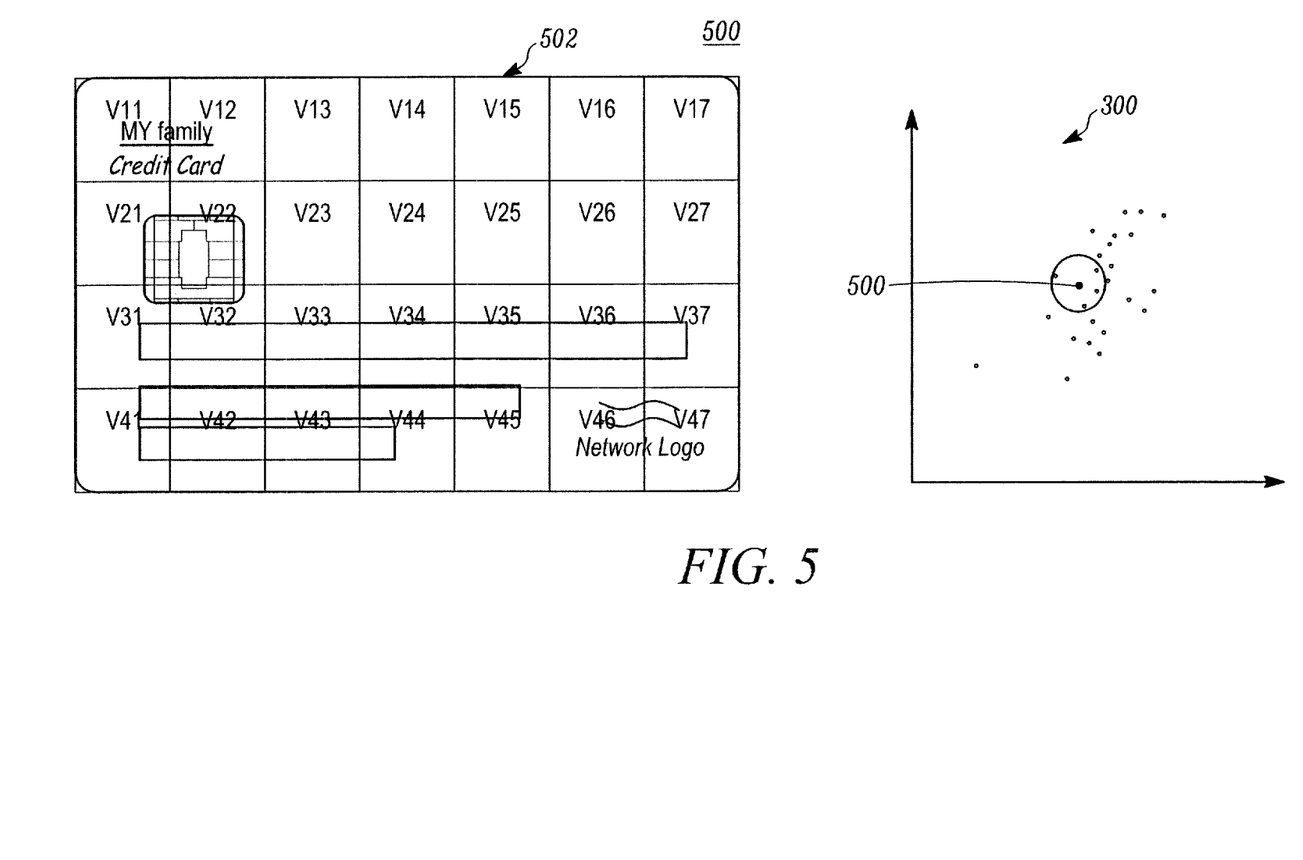
FIG. 5 shows an example position of the feature vector of the design of a detected payment card in the multi-dimensional space of FIG. 3.

FIG. 5 shows an example position 500 of the normalized feature vector of the design of a detected payment card 502 in the multi-dimensional space 300 of FIG. 3. As can be seen from FIG. 5, the position 500 may not necessarily match exactly with one of the scattered discrete points in the multi-dimensional space, but tends to be adjacent to at least one or more points. In the example embodiments, one or more payment card designs are selected from the database based on the position of the generated multi-dimensional feature vector representing the design of the detected payment card in the multi-dimensional space. For example, the closest k points are selected based on the distance between the detected payment card design and stored payment card designs in the database (i.e., the most similar designs). The distance of between points can be calculated based on, for example, the Euclidean distance, or the Manhattan distance, or the Minkowski distance, or any other form of self-defined distance. The value of k may be pre-set after taking into account factors, such as computational requirements for subsequent steps (as discussed in detail below), noise effects, relative distinctiveness of the various designs (i.e., how discriminative one design is compared to others). In alternate embodiments, it will be appreciated that other techniques may be used to determine at least one stored design that is most similar to the design of the detected payment card.

In another implementation, k can also be set to be the total number of pre-stored payment card designs, which means there is no pre-selection of a certain number of similar payment card designs to the detected payment card design. In the following steps, all stored payment card designs are used to compare with the detected payment card design in detail.

Figure 6:
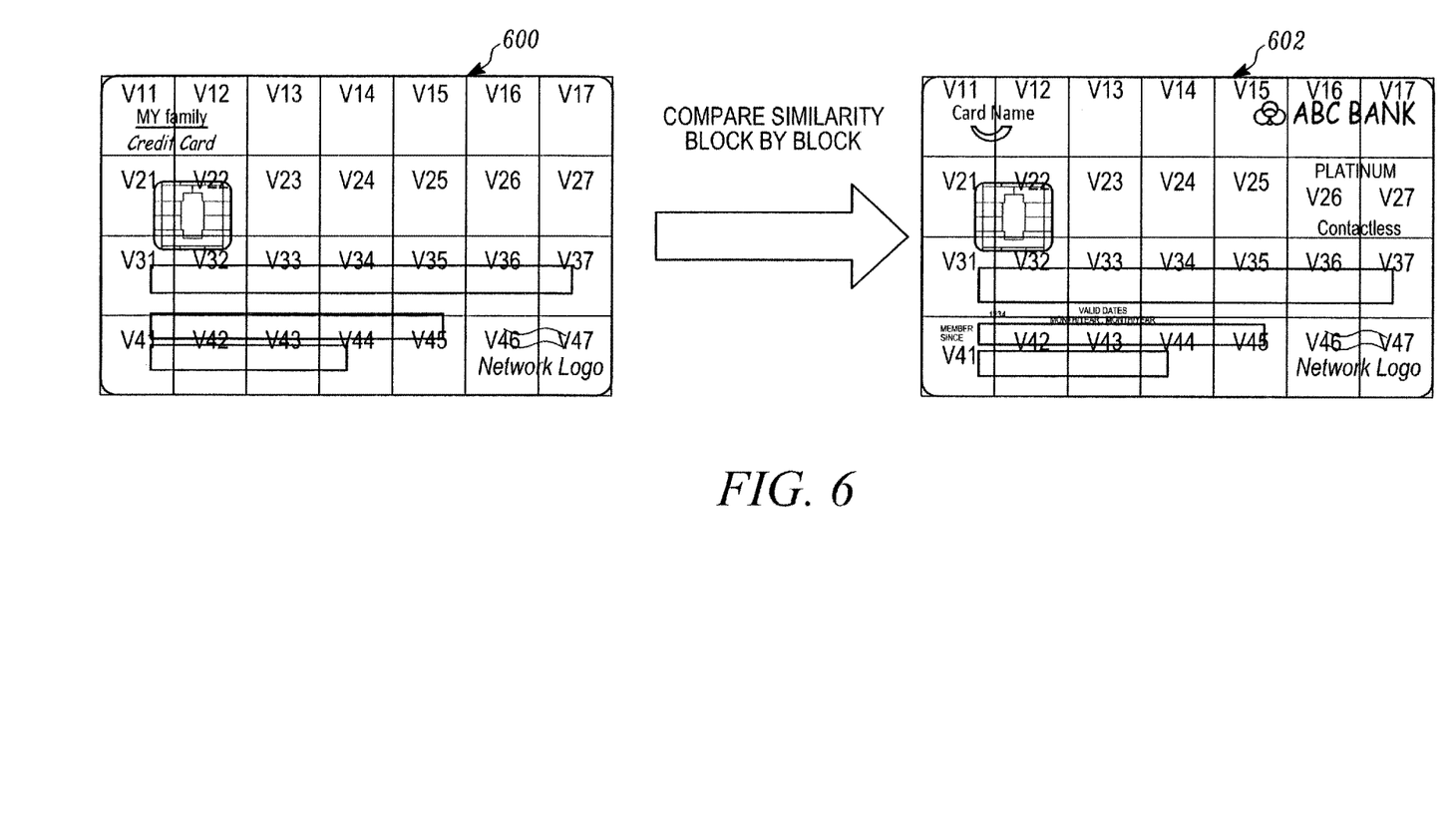
FIG. 6 shows a schematic diagram illustrating a comparison of a design of a detected card and a stored payment card design according to an example embodiment.

FIG. 6 shows a schematic diagram illustrating a comparison of a design of a detected payment card 600 and a stored payment card design 602 according to an example embodiment. In FIG. 6, the stored payment card design 602 corresponds to one of the closest matches determined from the multi-dimensional space 300 (FIG. 3). Here, a similarity score between the design of the detected payment card 600 and the stored payment card design 602 is generated. In one implementation, the individual blocks of the detected payment card 600 are compared with the corresponding blocks of the stored payment card design 602. In another implementation, the similarity score is calculated based on the comparison of the whole masked image of detected card design 600 with the whole masked image of the stored payment card design 602.

The comparison technique of the blocks of card design or whole card design images can be selected from the group consisting of convolution neural network (CNN), template matching and support vector machine (SVM). A trained classifier can be used to calculate the score of similarity using CNN or SVM. The training samples typically come from a large amount of pre-classified detected card designs taken from real environment.

In one implementation, a 2-class classifier is trained by using samples which belong to one of the card designs and rest of the samples which do not belong to the card design (as 2 classes). The sample data is put into training using methods such as SVM or CNN. The trained classifier is able to identify whether a given card design belongs to the particular stored card design and provide a similarity score for the result. A 2-class classifier is trained for each stored card design. The detected card design is given to every one of the 2-class-classifiers corresponding to the pre-selected K stored card designs' classifier to calculate the similarity with each of the stored card designs. The value K is used here to limit the number of comparisons to the stored card designs.

In another implementation, the samples of pre-classified card designs are used as training data for a multi-class classifier. Each sample card design is associated with one stored card design. The trained multi-class classifier is able to classify a given card design to one of the best match stored card designs with a similarity score. The detected card design is given as input to the multi-class classifier. The classifier gives an output of which class the detected card design belongs to and the similarity score to the class, which means how similar the detected card design to the closest matching stored card design.

If the comparison is done block by block of the card design image, each block image comparison may provide an individual score and a final score may be calculated from the individual scores, e.g., by using a weighted sum or other suitable techniques. The weight parameters used for final score calculation can be determined based on the training from a large number of card image samples using machine learning algorithms, like neural network, or logistic regression, or manually set based on experience. This step can be skipped if the comparison is done for card design image as a whole.

Typically, the design of the detected payment card 600 is associated with the selected payment card design having the highest similarity score. Alternatively or in combination, the design of the detected payment card 600 is associated with the selected payment card design providing the similarity score exceeding a predetermined threshold. The former approach can ensure that one result is always produced from the identification. The latter approach can prevent false positives, i.e., a design not sufficiently similar will be rejected even though it provides the highest similarity score, but may potentially return more than one result. A preferred approach may be a combination of the two approaches comprising a first filter using the threshold followed by a second filter based on the highest score.

As described above, an image of a payment card can be used to identify the payment card design without extracting personal data or sensitive information. This can provide additional security in electronic transactions. In some applications of the present method, the identification of the payment card design can be useful in providing information specific to the payment card. For example, after the design has been identified, information specific to the certain type of payment card based on the identified design can be retrieved from a database, or from the card issuer's website, and sent to the customer's device. Such information may include deals, promotions, offers, etc., available to that specific card type or card program. When used in conjunction with other sensed data, e.g., geolocation data, this can enhance the consumer's experience through the delivery of relevant information.

Figure 7:
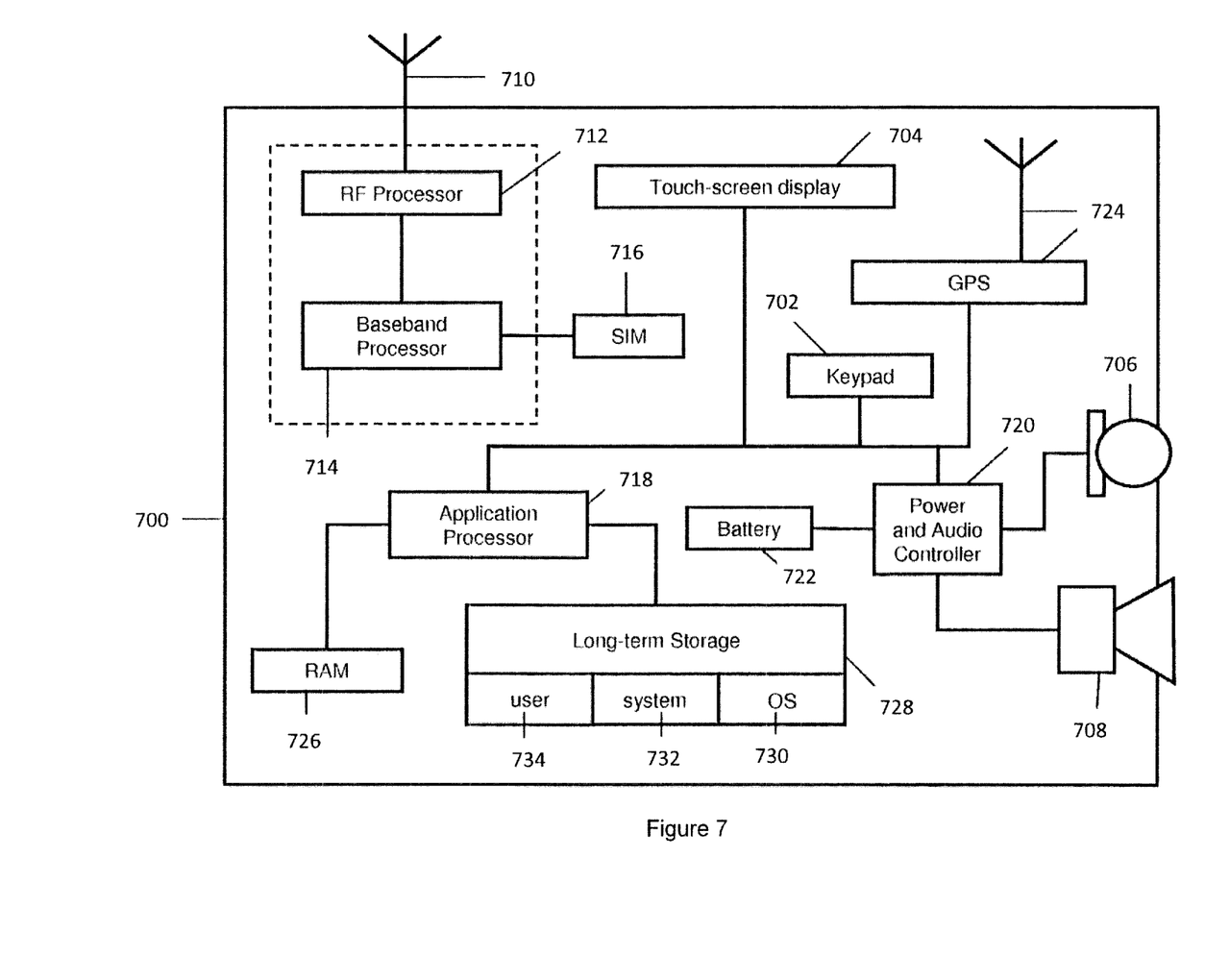
FIG. 7 shows a schematic diagram illustrating a wireless device for implementing the method of the example embodiments.

FIG. 7 shows a schematic of an exemplary wireless computing device 700 that may be utilized to implement the customer device of the example embodiments.

The wireless device 700 comprises a keypad 702, a touch-screen 704, a microphone 706, a speaker 708 and an antenna 710. The wireless device 700 is capable of being operated by a user to perform a variety of different functions, such as, for example, hosting a telephone call, sending an SMS message, browsing the Internet, sending an email and providing satellite navigation.

The wireless device 700 comprises hardware to perform communication functions (e.g., telephony, data communication), together with an application processor and corresponding support hardware to enable the wireless device 700 to have other functions, such as, messaging, Internet browsing, email functions, and the like. The communication hardware is represented by a radio frequency (RF) processor 712 which provides an RF signal to the antenna 710 for the transmission of data signals, and the receipt therefrom. Additionally provided is a baseband processor 714, which provides signals to and receives signals from the RF Processor 712. The baseband processor 714 also interacts with a subscriber identity module (SIM) 716, as is well known in the art. The communication subsystem enables the wireless device 700 to communicate via a number of different communication protocols, including 3G, 4G, GSM, WiFi, Bluetooth™ and/or CDMA. The communication subsystem of the wireless device 700 is beyond the scope of the present disclosure.

The keypad 702 and the touch-screen 704 are controlled by an application processor 718. A power and audio controller 720 is provided to supply power from a battery 722 to the communication subsystem, the application processor 718, and the other hardware. The power and audio controller 720 also controls input from the microphone 706, and audio output via the speaker 708. Also provided is a global positioning system (GPS) antenna and associated receiver element 724 which is controlled by the application processor 718 and is capable of receiving a GPS signal for use with a satellite navigation functionality of the wireless device 700.

In order for the application processor 718 to operate, various different types of memory are provided. Firstly, the wireless device 700 includes Random Access Memory (RAM) 726 connected to the application processor 718 into which data and program code can be written and read from at will. Code placed anywhere in RAM 726 can be executed by the application processor 718 from the RAM 726. RAM 726 represents a volatile memory of the wireless device 700.

Secondly, the wireless device 700 is provided with a long-term storage 728 connected to the application processor 718. The long-term storage 728 comprises three partitions, an operating system (OS) partition 730, a system partition 732 and a user partition 734. The long-term storage 728 represents a non-volatile memory of the wireless device 700.

In the present example, the OS partition 730 contains the firmware of the wireless device 700 which includes an operating system. Other computer programs may also be stored on the long-term storage 728, such as application programs (also referred to as apps), and the like. In particular, application programs which are mandatory to the wireless device 700, such as, in the case of a smartphone, communications applications and the like are typically stored in the system partition 732. The application programs stored on the system partition 732 would typically be those which are bundled with the wireless device 700 by the device manufacturer when the wireless device 700 is first sold.

Application programs which are added to the wireless device 700 by the user would usually be stored in the user partition 734.

As stated, the representation of FIG. 7 is schematic. In practice, the various functional components illustrated may be substituted into one and the same component. For example, the long-term storage 728 may comprise NAND flash, NOR flash, a hard disk drive or a combination of these.

Figure 8:
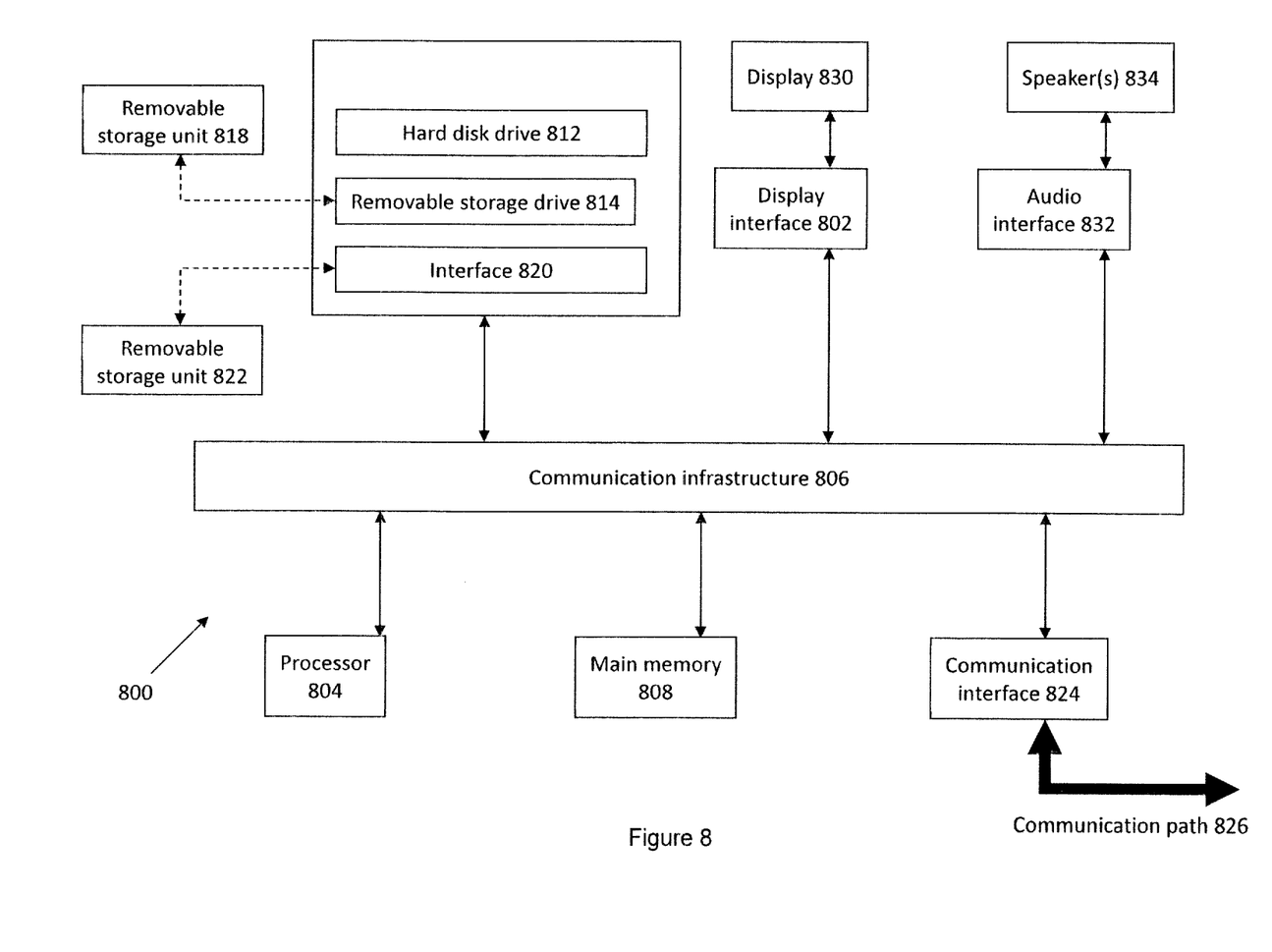
FIG. 8 shows a schematic diagram illustrating a computer suitable for implementing the method and system of the example embodiments.

FIG. 8 depicts an exemplary computing device 800, hereinafter interchangeably referred to as a computer system 800, where one or more such computing devices 800 may be used in the generation of the numerical representations of the payment card designs. The following description of the computing device 800 is provided by way of example only and is not intended to be limiting.

As shown in FIG. 8, the example computing device 800 includes a processor 804 for executing software routines. Although a single processor is shown for the sake of clarity, the computing device 800 may also include a multi-processor system. The processor 804 is connected to a communication infrastructure 806 for communication with other components of the computing device 800. The communication infrastructure 806 may include, for example, a communications bus, cross-bar, or network.

The computing device 800 further includes a main memory 808, such as a random access memory (RAM), and a secondary memory 810. The secondary memory 810 may include, for example, a hard disk drive 812 and/or a removable storage drive 814, which may include a floppy disk drive, a magnetic tape drive, an optical disk drive, or the like. The removable storage drive 814 reads from and/or writes to a removable storage unit 818 in a well-known manner. The removable storage unit 818 may include a floppy disk, magnetic tape, optical disk, or the like, which is read by and written to by removable storage drive 814. As will be appreciated by persons skilled in the relevant art(s), the removable storage unit 818 includes a computer readable storage medium having stored therein computer executable program code instructions and/or data.

In an alternative implementation, the secondary memory 810 may additionally or alternatively include other similar means for allowing computer programs or other instructions to be loaded into the computing device 800. Such means can include, for example, a removable storage unit 822 and an interface 820. Examples of a removable storage unit 822 and interface 820 include a program cartridge and cartridge interface (such as that found in video game console devices), a removable memory chip (such as an EPROM or PROM) and associated socket, and other removable storage units 822 and interfaces 820 which allow software and data to be transferred from the removable storage unit 822 to the computer system 800.

The computing device 800 also includes at least one communication interface 824. The communication interface 824 allows software and data to be transferred between computing device 800 and external devices via a communication path 826. In various embodiments, the communication interface 824 permits data to be transferred between the computing device 800 and a data communication network, such as a public data or private data communication network. The communication interface 824 may be used to exchange data between different computing devices 800 which such computing devices 800 form part of an interconnected computer network. Examples of a communication interface 824 can include a modem, a network interface (such as an Ethernet card), a communication port, an antenna with associated circuitry, and the like. The communication interface 824 may be wired or may be wireless. Software and data transferred via the communication interface 824 are in the form of signals which can be electronic, electromagnetic, optical or other signals capable of being received by communication interface 824. These signals are provided to the communication interface via the communication path 826.

As shown in FIG. 8, the computing device 800 further includes a display interface 802 which performs operations for rendering images to an associated display 830 and an audio interface 832 for performing operations for playing audio content via associated speaker(s) 834.

As used herein, the term "computer program product" may refer, in part, to removable storage unit 818, removable storage unit 822, a hard disk installed in hard disk drive 812, or a carrier wave carrying software over communication path 826 (wireless link or cable) to communication interface 824. Computer readable storage media refers to any non-transitory tangible storage medium that provides recorded instructions and/or data to the computing device 800 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 800. Examples of transitory or non-tangible computer readable transmission media that may also participate in the provision of software, application programs, instructions and/or data to the computing device 800 include radio or infra-red transmission channels as well as a network connection to another computer or networked device, and the Internet or Intranets, including e-mail transmissions and information recorded on Websites, and the like.

The computer programs (also called computer program code) are stored in main memory 808 and/or secondary memory 810. Computer programs can also be received via the communication interface 824. Such computer programs, when executed, enable the computing device 800 to perform one or more features of embodiments discussed herein. In various embodiments, the computer programs, when executed, enable the processor 804 to perform features of the above-described embodiments. Accordingly, such computer programs represent controllers of the computer system 800.

Software may be stored in a computer program product and loaded into the computing device 800 using the removable storage drive 814, the hard disk drive 812, or the interface 820. Alternatively, the computer program product may be downloaded to the computer system 800 over the communications path 826. The software, when executed by the processor 804, causes the computing device 800 to perform functions of embodiments described herein.

It is to be understood that the embodiment of FIG. 8 is presented merely by way of example. Therefore, in some embodiments one or more features of the computing device 800 may be omitted. Also, in some embodiments, one or more features of the computing device 800 may be combined together. Additionally, in some embodiments, one or more features of the computing device 800 may be split into one or more component parts.

It will be appreciated that the elements illustrated in FIG. 8 function to provide means for performing the various functions and operations of the servers as described in the above embodiments.

In an implementation, a server may be generally described as a physical device comprising at least one processor and at least one memory including computer program code. The at least one memory and the computer program code are configured to, with the at least one processor, cause the physical device to perform the requisite operations.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

With that said, and as described, it should be appreciated that one or more aspects of the present disclosure transform a general-purpose computing device into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of identifying a payment card design, the method comprising:
    partitioning, by a processor, an image of a detected payment card into a plurality of blocks, the detected payment card including card features and personal data, the image comprising predetermined portions defined by the personal data irreversibly masked, such that the personal data is unknown to the processor;
    generating, by the processor, an individual numerical representation of each respective one of the plurality of blocks, thereby generating a collective numerical representation of the card features of the detected payment card, but not the personal data;
    selecting, from a database storing a plurality of payment card designs, one or more payment card designs based on the collective numerical representation of the card features of the detected payment card;
    generating, by the processor, a similarity score based on a comparison of the individual numerical representations, per block, to each of the one or more selected payment card designs; and
    associating, by the processor, one of the one or more selected payment card designs as a design of the detected payment card based on the similarity score of at least the one of the one or more selected payment card designs.

2. The method as claimed in claim 1, wherein each numerical representation comprises a respective feature vector.

3. The method as claimed in claim 2, wherein the stored payment card designs comprise respective feature vectors in a multi-dimensional space, and wherein the one or more stored payment card designs are selected based on a position of the generated collective feature vector representing the card features of the detected payment card in the multi-dimensional space.

4. The method as claimed in claim 3, wherein the one or more stored payment card designs are selected based on distance to the position of the generated collective feature vector representing the card features of the detected payment card in the multi-dimensional space.

5. The method as claimed in claim 3, wherein each stored payment card design comprises a design received from a trusted source, and wherein storing said design comprises:
    irreversible masking, by a processor coupled to the database, predetermined portions of the payment card design;
    partitioning, by the processor coupled to the database, the payment card design received from the trusted source into a plurality of blocks;
    generating, by the processor coupled to the database, an individual feature vector of each respective one of the plurality of blocks, thereby generating a collective feature vector of the payment card design received from the trusted source; and
    storing the collective feature vector in the database.

6. The method as claimed in claim 5, further comprising normalizing the individual feature vectors of the plurality of blocks before generating the collective feature vector of the payment card design received from the trusted source.

7. The method as claimed in claim 6, wherein storing said design further comprises using the design to train a 2-class or multi-class classifier.

8. The method as claimed in claim 1, wherein generating a similarity score comprises using one technique selected from the group consisting of convolutional neural network (CNN), template matching and support vector machines (SVM).

9. The method as claimed in claim 1, wherein generating the similarity score further comprises comparing the whole image of the detected payment card with a whole image of the one or more selected card designs.

10. The method as claimed in claim 7, wherein comparing comprises using a trained 2-class or multi-class classifier.

11. The method as claimed in claim 1, wherein partitioning the image of the detected payment card into a plurality of blocks comprises assigning respective weights to the blocks, or weight vectors to the numerical representation of the blocks.

12. The method as claimed in claim 1, wherein each stored payment card design comprises information selected from a group consisting of issuer name, card network, card type, and card program.

13. A system for identifying a payment card design, comprising a processor and a memory unit communicatively coupled to the processor, wherein the processor is configured to:
    partition an image of a detected payment card into a plurality of blocks, the detected payment card including card features and personal data, the image comprising predetermined portions defined by the personal data irreversibly masked and being at least temporarily stored in the memory unit;
    generate an individual numerical representation of each respective one of the plurality of blocks, to thereby generate a collective numerical representation of the card features of the detected payment card;
    select, from a database storing a plurality of payment card designs, one or more payment card designs based on the collective numerical representation of the design of the detected payment card;
    generate a similarity score between the card features of the detected payment card and each of the one or more selected payment card designs based on a comparison of the individual numerical representations of the plurality of blocks of the detected payment card to corresponding blocks of the one or more selected payment card designs; and
    associate one of the one or more selected payment card designs as a design of the detected payment card based on the similarity score of at least the one of the one or more selected payment card designs.

14. The system as claimed in claim 13, wherein each numerical representation comprises a respective feature vector.

15. The system as claimed in claim 14, wherein the stored payment card designs comprise respective feature vectors in a multi-dimensional space, and wherein the processor is further configured to select the one or more stored payment card designs based on a position of the generated collective feature vector representing the design of the detected payment card in the multi-dimensional space.

16. The system as claimed in claim 15, wherein the processor is further configured to select the one or more stored payment card designs based on a distance to the position of the generated collective feature vector representing the design of the detected payment card in the multi-dimensional space.

17. The system as claimed in claim 13, wherein the processor is further configured to generate a similarity score using one technique selected from the group consisting of convolutional neural network (CNN), template matching and support vector machines (SVM).

18. The system as claimed in claim 13, wherein the processor is further configured to partition the image of the detected payment card into a plurality of blocks by assigning respective weights to the blocks, or weight vectors to the numerical representation of the blocks; and
wherein each stored payment card design comprises information selected from a group consisting of issuer name, card network, card type, and card program.

19. A non-transitory computer-readable storage medium having stored thereon computer instructions for use in identifying a payment card design, which when executed by a processor, cause the processor to:
partition an image of a detected payment card into a plurality of blocks, the detected payment card including card features and personal data, the image comprising predetermined portions defined by the personal data irreversibly masked, such that the personal data is unknown to the processor;
generate an individual numerical representation of each respective one of the plurality of blocks, thereby generating an overall numerical representation of the card features of the detected payment card, but not the personal data;
select, from a database storing a plurality of payment card designs, one or more payment card designs based on the overall numerical representation of the design of the detected payment card;
generate a similarity score based on a comparison of the individual numerical representations, per block, to each of the one or more selected payment card designs; and
associate one of the one or more selected payment card designs as a design of the detected payment card based on the similarity score of at least the one of the one or more selected payment card designs.

* * * * *